(12) United States Patent
Wiedemann et al.

(10) Patent No.: US 11,485,304 B2
(45) Date of Patent: Nov. 1, 2022

(54) ENHANCED BUMPER SYSTEM

(71) Applicant: CONSTELLIUM SINGEN GMBH, Singen (DE)

(72) Inventors: Jochen Wiedemann, Radolfzell (DE); Thomas Schmid, Radolfzell (DE); Tim Kleindick, Singen (DE)

(73) Assignee: CONSTELLIUM SINGEN GMBH, Singen (DE)

( * ) Notice: Subject to any disclaimer, the term of this patent is extended or adjusted under 35 U.S.C. 154(b) by 103 days.

(21) Appl. No.: 17/263,981

(22) PCT Filed: Sep. 20, 2019

(86) PCT No.: PCT/EP2019/075348
§ 371 (c)(1),
(2) Date: Jan. 28, 2021

(87) PCT Pub. No.: WO2020/058485
PCT Pub. Date: Mar. 26, 2020

(65) Prior Publication Data
US 2021/0316684 A1   Oct. 14, 2021

(30) Foreign Application Priority Data
Sep. 20, 2018 (EP) .................................. 18195823

(51) Int. Cl.
*B60J 7/00* (2006.01)
*B60R 19/34* (2006.01)
(Continued)

(52) U.S. Cl.
CPC ................. *B60R 19/34* (2013.01); *B60D 1/56* (2013.01); *B60R 2019/1813* (2013.01); *B60Y 2410/124* (2013.01); *B60Y 2410/125* (2013.01)

(58) Field of Classification Search
CPC ..... B60R 19/18; B60R 21/0136; B60R 21/34; B60R 19/483; B60R 2019/186;
(Continued)

(56) References Cited

U.S. PATENT DOCUMENTS 3,853,344 A * 12/1974 Shimoe ................. B60R 19/36
293/133
4,465,312 A * 8/1984 Werner ................. B60R 19/36
293/133
(Continued)

FOREIGN PATENT DOCUMENTS

DE   102009048466 A1   4/2011
DE   102011121381 A1   6/2013
(Continued)

OTHER PUBLICATIONS

International Search Report, dated Oct. 25, 2019, corresponding to International Application No. PCT/EP2019/075348.

*Primary Examiner* — Kiran B Patel
(74) *Attorney, Agent, or Firm* — Ladas & Parry LLP; Malcolm J. MacDonald

(57) ABSTRACT

A bumper system (4) for a motor vehicle comprising a cross beam (1) which is globally orientated in a transverse direction (Y), said cross beam comprising a front wall (6) adapted to receive a crash impact force and a rear wall (5) opposed and spaced from said front wall, at least one absorber (2), at least an intermediate component (3) to attach the absorber (2) to the cross beam (1), said intermediate component (3) being connected to the rear wall (5) through a first contact area (10), distant from a longitudinal axis (LL), by an internal component distance, called $L_{in}$, and an external component distance, called $L_{out}$, which corresponds respectively to the minimum and maximum distance between said first contact area (10) and the longitudinal axis (LL), said longitudinal axis (LL) passing at mid width of the cross (Continued)

beam and being perpendicular to the transverse direction (Y), said intermediate component (3) being connected to the absorber (2) through a second contact area (20) distant from the longitudinal axis (LL) by an internal profile distance, called $D_{in}$, and an external profile distance, called $D_{out}$, which corresponds respectively to the minimum and maximum distance between the second contact (20) area and the longitudinal axis (LL), wherein a part of the intermediate component distant from the longitudinal axis (LL) by a distance comprised between $L_{out}$ and $D_{out}$ has a smaller bending stiffness ($S_{interm}$) about a vertical axis (Z) than a part of the cross beam distant from the longitudinal axis (LL) by a distance comprised between $L_{out}$ and $D_{in}$ ($S_{cross}$), said vertical axis (Z) being perpendicular to the transverse direction (Y) and the longitudinal axis (LL).

13 Claims, 5 Drawing Sheets

(51) Int. Cl.
  *B60D 1/56* (2006.01)
  *B60R 19/18* (2006.01)
(58) Field of Classification Search
  CPC ... B60R 19/34; B60R 2019/1813; B60R 9/06; Y10S 224/924
  See application file for complete search history.

(56) References Cited

U.S. PATENT DOCUMENTS

| | | | | |
|---|---|---|---|---|
| 4,762,352 A * | 8/1988 | Enomoto | | B60R 19/18 293/122 |
| 5,603,541 A * | 2/1997 | Wada | | B60R 19/18 293/154 |
| 5,984,390 A * | 11/1999 | Kemp | | B60R 19/34 293/133 |
| 7,837,244 B2 | 11/2010 | Hashimura | | |
| 8,622,446 B2 * | 1/2014 | Handing | | B60R 19/18 293/155 |
| 8,844,987 B2 * | 9/2014 | Kaneko | | B60R 19/34 293/133 |
| 8,919,834 B2 * | 12/2014 | Freundl | | B60R 19/34 293/133 |
| 9,463,758 B2 | 10/2016 | Tamura et al. | | |
| 9,533,641 B2 | 1/2017 | Kutscher et al. | | |
| 9,725,057 B2 | 8/2017 | Lee et al. | | |
| 9,937,882 B2 * | 4/2018 | Kutscher | | B60R 19/48 |
| 2005/0104392 A1 * | 5/2005 | Liebhard | | B60R 19/18 293/132 |
| 2006/0103514 A1 * | 5/2006 | Hosokawa | | B60R 21/0136 340/436 |
| 2007/7025676 | 11/2007 | Brodt et al. | | |
| 2009/0015392 A1 * | 1/2009 | Takahashi | | B60R 21/0136 340/901 |
| 2009/0079210 A1 * | 3/2009 | Matsumura | | B60R 19/24 293/155 |
| 2010/0109354 A1 * | 5/2010 | Agrahari | | B60R 19/34 293/120 |
| 2010/0201139 A1 * | 8/2010 | Hashimura | | B60R 19/18 293/133 |
| 2011/0127783 A1 * | 6/2011 | Shimotsu | | B60R 19/18 293/132 |
| 2011/0291431 A1 | 12/2011 | Buschsieweke et al. | | |
| 2013/0113224 A1 * | 5/2013 | Tsuchida | | B60R 19/24 293/102 |
| 2015/0151699 A1 * | 6/2015 | Kaneko | | B60R 19/34 293/133 |
| 2015/0343972 A1 * | 12/2015 | Lee | | B60R 19/023 293/133 |
| 2016/0001722 A1 * | 1/2016 | Nickel | | B60R 19/34 293/120 |
| 2016/0144814 A1 * | 5/2016 | Ahn | | B23K 31/022 293/133 |
| 2016/0264084 A1 * | 9/2016 | Handing | | B60R 19/34 |
| 2016/0288750 A1 * | 10/2016 | Nickel | | B60R 19/483 |
| 2016/0297387 A1 * | 10/2016 | Prasoody | | B60R 19/24 |
| 2021/0086711 A1 * | 3/2021 | Nilsson | | B60R 19/34 |

FOREIGN PATENT DOCUMENTS

| | | |
|---|---|---|
| WO | 2011024996 A1 | 3/2011 |
| WO | 2011075031 A1 | 6/2011 |

* cited by examiner

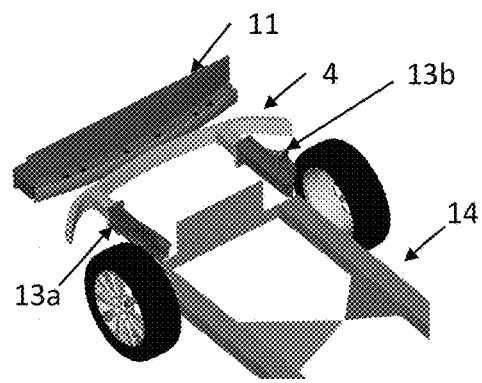
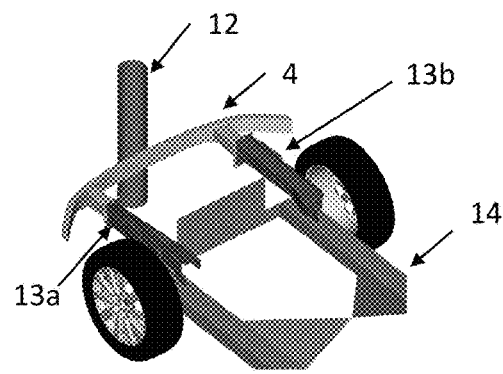
Fig. 11
Fig. 12
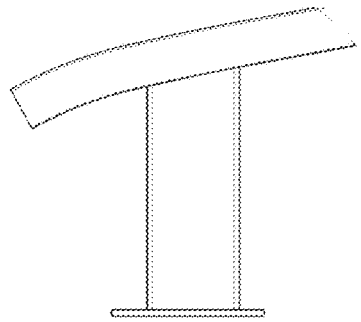
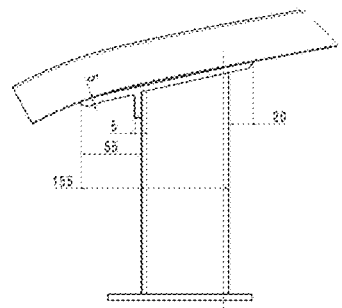
Fig. 13
Fig. 14
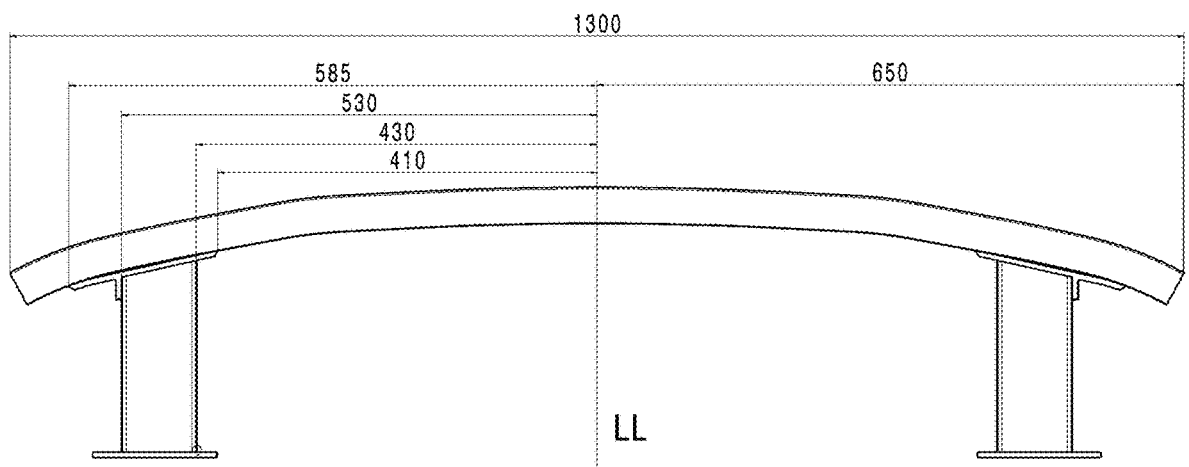
Fig. 15

ENHANCED BUMPER SYSTEM

FIELD OF THE INVENTION

The present invention relates to a bumper system for a motor vehicle including an intermediate component between an absorber and a cross beam to improve its ability to sustain crash impact without rupture.

BACKGROUND OF THE INVENTION

A bumper system permits to minimize damage or injury by absorption of energy through elastic and, eventually, plastic deformation during frontal and rear collisions with pedestrians, other vehicles and fixed obstacles.

Generally, a bumper system for motor vehicle comprises a cross beam which is attached to supports remote from each other, such as absorber or crash boxes, and located in continuation of the longitudinal frame members of the motor vehicle.

For example, US20160297387 of Benteler discloses a bumper arrangement for a motor vehicle, including a cross member made of a lightweight metal and constructed as multi-chamber section; and crash boxes arranged in respective end regions of the cross member for coupling the bumper arrangement with the motor vehicle.

From the state-of-the-art, bumper systems are arranged on the front side and/or on the rear side of a motor vehicle. For this purpose, the bumper systems have a cross beam, which essentially extends over at least a part of the width of the motor vehicle body. In order to absorb the kinetic energy generated in such a crash, the cross beam is also coupled with the motor vehicle body, and in particular with the longitudinal frame members, via absorbers. Absorbers, also referred to crash boxes or energy absorber elements are configured so as to undergo deformation as a result of the impact and thus convert kinetic energy into deformation energy by cold deformation. In most cases the absorbers are coupled with the front longitudinal members of the motor vehicle body in order to introduce the additional crash energy into them.

Absorbers are generally constituted from a profile member, such as in WO2014030592 of Nippon Steel or EP2335984 of Benteler with the main direction oriented parallel with the longitudinal members or perpendicularly to it in U.S. Pat. No. 8,590,952 of Hyundai Motor. It has preferably a hollow structure.

The profile member is generally directly connected to the cross beam by using fasteners such as in US20160297387, U.S. Pat. No. 8,844,987 of AISIN, DE102011121381 of WALDASCHAFF AUTOMOTIVE or by welding such as in EP2668068 of Constellium or U.S. Pat. No. 8,919,834 of Magna or WO2011075031 of GESTAMP HARTECH. U.S. Pat. No. 7,837,244 of Kobe Steel discloses a front flange which facilitates the fixture of the absorber to the bumper beam as it permits to fit the linear or curved rear side portions of the rearwardly bent portions of the bumper.

The profile member can also be connected to the cross beam through a front flange. US2016264084 of Benteler discloses a bumper system for a motor vehicle with at least one crashbox, which is arranged by means of a bracket on a bumper cross member, wherein the bracket is provided with a first bracket plate and a second bracket plate, while the first bracket plate bears at least partly against a first limiting element and the second bracket plate against a second limiting element of the bumper cross member such that the first bracket plate and/or the second bracket plate extends in the direction of the vehicle longitudinal axis. This bracket permits the bumper cross member to be unable to be deformed in event of loading in the region of the connection to the bracket without there being an application of energy directly to the bracket and thus to the crashbox, the bumper system and the bodywork.

U.S. Pat. No. 9,725,057 of Hyundai Motors discloses a crash box with a front connection portion that is connected to both ends of a back beam of the vehicle.

The cross beam can be configured as bending-stiff as possible so that the different impact scenarios, for example collision with a pole, a bumper-to-bumper crash or also the collision with an obstacle, are accounted for and an uncontrolled entering into the motor vehicle is prevented. Absorbers being connected with the cross beam and the longitudinal members, the load path thus extends from the bumper cross beam via the absorbers into the longitudinal members of the motor vehicle. If the cross beam is configured with a high bending stiffness, cracks often occurs at the connection between the absorber and the cross beam. In particular, when the absorber is directly welded to the bumper cross beam, crack occurs in the heat affected zone and the crash management systems does not sustain a sufficient load.

The invention aims at solving this issue.

SUMMARY OF THE INVENTION

The invention consists in a bumper system for a motor vehicle.

The bumper system of the invention comprises:
- a cross beam which is globally orientated in a transverse direction (Y). The term "globally oriented" is aiming to define that the main cross beam direction extends in said transverse direction (Y). In one embodiment, the cross beam can be curved and is consequently in this case not perfectly parallel to the transverse direction (Y), but his main direction is globally orientated in the transverse direction (Y), i.e. extends in said transverse direction (Y). The cross beam comprises a front wall adapted to receive a crash impact force and a rear wall opposed and spaced from said front wall. In a preferred embodiment, said cross beam is made in aluminum or steel. Preferably, it is an extruded member. Preferentially, said extruded member is a hollow section, preferentially with at least two chambers.
- at least one absorber; The absorber, also called crash box or energy absorber element is a thin-walled structure, with at least one outer wall. Preferably at least two absorbers are used in a motor vehicle. Preferably, an absorber comprises at least one profile member. Preferentially, said profile member is made in aluminum or steel. Preferably, it is an extruded member. Preferentially, said extruded member is a hollow section. Preferentially, said hollow extrusion has at least two chambers. Preferably, an absorber comprises an endplate fixed at one end of the profile member permitting to attach the absorber to a longitudinal member of the vehicle. In another embodiment, said profile member is a solid extrusion, with at least one outer wall.
- an intermediate component for attaching the absorber to the cross beam, According to the invention, the intermediate component is connected to the rear wall of the cross beam through at least a first contact area. The first contact area is defined by the surface intercept between the rear wall of the cross beam and the intermediate component when said intermediate component is lying on said rear wall. In one embodiment, the first contact area is non continuous, i.e. made of at least two surfaces which are not contiguous. This case may occur when the part of the surface of the rear wall of the cross beam on which the intermediate component is lying on, and/or the part of the surface of the intermediate component which is supposed to be laid on the cross beam is not flat. This can be the case when the cross beam is curved.

The first contact area is distant from a longitudinal axis (LL), by an internal component distance, called $L_{in}$, and an external component distance, called $L_{out}$, which corresponds respectively to the minimum and maximum distance between said first contact area and the longitudinal axis (LL). The longitudinal axis (LL) is passing at mid width of the cross beam and is perpendicular to the transverse direction (Y).

The longitudinal axis (LL) is substantially parallel to a longitudinal direction (X). Preferably, the first contact area extends substantially in a plane Y-Z where Y corresponds to the transverse direction and Z is a vertical direction. The vertical direction is perpendicular to the transverse direction (Y) and the longitudinal direction (X). The word "substantially" is meaning that the first contact area is roughly parallel to the plane Y-Z. It includes the case where the surfaces of the rear wall and/or the intermediate components is not flat. Preferably the first contact area extends substantially exclusively in a plane Y-Z. It permits to insure that the intermediate component plays the role of trigger and deform in case of an impact force on the front wall of the cross beam.

Preferably, the intermediate component is connected to the cross beam through at least a first contact area by welding or bonding.

Preferably, at least a part of the first contact area is welded or bonded. Preferably, the part of the first contact area which is welded or bonded is non continuous.

Preferably, the part of the first contact area, which is welded or bonded, is distant from the longitudinal axis (LL) by a distance comprised between 0.8 $L_{out}$ and $L_{out}$ or between $L_{in}$ and 1.2 $L_{in}$. It permits to insure that the intermediate component plays the role of trigger and deform in case of an impact force on the front wall of the cross beam.

In another embodiment, the intermediate component is connected to the cross beam through at least a first contact area by screwing.

According to the invention, said intermediate component is connected to the absorber, preferably via the profile member through a second contact area. The second contact area is defined by the surface intercept when the intermediate component is lying on the absorber. Preferably, the second contact area is defined by the surface of contact between one end of the profile member and the intermediate component. The second contact area is distant from the longitudinal axis (LL) by an internal profile distance, called $D_{in}$, and an external profile distance, called $D_{out}$, which corresponds respectively to the minimum and maximum distance between the second contact area and the longitudinal axis (LL).

Preferably, the intermediate component is connected to the absorber through a second contact area by welding or bonding. Preferably, at least a part of the second contact area is welded or bonded. In another embodiment, the intermediate component is connected to the cross beam through at least a first contact area by screwing.

Preferably, the part of the second contact area which is welded or bonded is non continuous.

To sustain a high load impact without experiencing a premature rupture, the inventors have found that it was possible by using an intermediate component to attach the cross beam to an absorber if the intermediate component plays the role of trigger and deform before any rupture is observed. To obtain this effect, a part of the intermediate component distant from the longitudinal axis (LL) by a distance comprised between $L_{out}$ and $D_{out}$ has a smaller bending stiffness ($S_{interm}$) about the vertical axis (Z) than a part of the cross beam distant from the longitudinal axis (LL) by a distance comprised between $L_{out}$ and $D_{in}$ ($S_{cross}$), said vertical axis (Z) being perpendicular to the transverse direction (X) and the longitudinal axis (LL).

Bending stiffness about the vertical axis (Z) of a beam is defined like the product of the modulus of elasticity of the beam by his area moment of inertia compared to the vertical axis (Z). The area moment of inertia, also known as moment of inertia of plane area, second moment of area, or second area moment, is a geometrical property of an area which reflects how its points are distributed with regard to an arbitrary axis.

In the case of usual simple geometrical forms like for example rectangular, circular or annular shape, the second area moment could be calculate using analytic formulas known in the field of mechanics. For more complex geometrical forms, like a "T", a "I" or "H" shape, it is often easier to divide the area into a series of "simpler" shapes. The second moment of area for the entire shape is the sum of the second moment of areas of all of its parts about a common axis. When the complex form includes missing area, like holes or hollow shape, the second moment of area of the missing areas are calculated and subtracted, rather than added. For example such formulas could be found in "Formeln and Tabellen zur Technischen Mechanik Taschenbuch" from Alfred Böge (Auflage: 22, —2011) published by Vieweg+Teubner Verlag or in "Einführung in die Festigkeitslehre" from Volker Läpple (2011) published by Vieweg+Teubner Verlag. The person skilled in the art who will calculate an area moment of inertia of a beam will use a software or CAD-Tool, for example CATIA V5 from the company Dassault Systèmes, NX from the company Siemens PLM Software, or other.

Bending stiffness comparison of two beams could be measured by comparing the arrow of each one of these beams vis-a-vis the same load applied at their loose end (other end intended to be fixed).

According to the invention, the bending stiffness of a part of the intermediate component located at a distance from the longitudinal axis (LL) comprised between $L_{out}$ and $D_{out}$ is smaller than the bending stiffness of a part of the cross beam distant from the longitudinal axis (LL) by a distance comprised between $L_{out}$ and $D_{in}$ ($S_{cross}$) about the vertical direction (Z). It implies that according to the formula of the bending stiffness, to have a smaller bending stiffness of the intermediate component, it can be obtained by playing on the modulus of elasticity or on the area moment of inertia, knowing that the area moment of inertia of the intermediate component or the cross beam has to be considered respectively between $L_{out}$ and $D_{out}$ and $L_{out}$ and $D_{in}$. It permits to insure that the intermediate component plays the role of trigger and deform in case of an impact force on the front wall of the cross beam.

Preferably, a part of the intermediate component distant from the longitudinal axis (LL) by a distance comprised between $L_{out}$ and $D_{out}$ has a bending stiffness ($S_{interm}$) about the vertical axis (Z) lower than 100%, more preferably lower than 50%, even more preferably lower than 10% or 1% than the bending stiffness of a part of the cross beam distant from the longitudinal axis (LL) by a distance comprised between $L_{out}$ and $D_{in}$ ($S_{cross}$). It means that preferably the ratio $S_{interm}/S_{cross}$ is preferably lower than 1, more preferably lower than 0.5, even more preferably lower than 0.1 or 0.01.

The lower bending stiffness, i.e. added bending compliance, of the intermediate component reduces the stiffness of the connection between the cross beam and the absorber against a bending moment around z-axis. During a bending load, applied on the front wall of the cross-beam, the compliance of the intermediate component leads to a reduced applied load on the connection technology between the crossbeam and the absorber and permits to avoid the rupture and to sustain the load impact.

In some particular embodiment of the invention, the bending stiffness of a part of the intermediate component located at a distance from the longitudinal axis (LL) comprised between $L_{out}$ and $D_{out}$ and/or the bending stiffness of a part of the cross beam comprised between $L_{out}$ and $D_{in}$ ($S_{cross}$) about the vertical direction (Z) might be not constant. In this embodiment, the bending stiffness ($S_{interm}$) of part of the intermediate component has a minimum bending stiffness ($S_{interm,\ min}$) about the vertical axis (Z) and/or the bending stiffness of part of the cross beam ($S_{cross}$) has a minimum bending stiffness ($S_{cross,\ min}$) about the vertical axis (Z), and the minimum bending stiffness ($S_{interm,\ min}$) of part of the intermediate component is smaller than the minimum bending stiffness of part of the cross beam ($S_{cross,\ min}$).

In a particular embodiment, the minimum bending stiffness ($S_{interm,\ min}$) of a part of the intermediate component located at a distance from the longitudinal axis (LL) comprised between $L_{out}$ and $D_{out}$ about the vertical axis (Z) is lower than 100%, more preferably lower than 50%, even more preferably lower than 10% or 1% than the minimum bending stiffness of a part of the cross beam distant from the longitudinal axis (LL) by a distance comprised between $L_{out}$ and $D_{in}$ ($S_{cross,\ min}$). The ratio $S_{interm,\ min}/S_{cross,\ min}$ is preferably lower than 1, more preferably lower than 0.5, even more preferably lower than 0.1 or 0.01

Depending on the particular embodiment of the invention, the bending stiffness ($S_{intern}$) can be the minimum bending stiffness ($S_{interm,\ min}$) of part of the intermediate component located at a distance from the longitudinal axis (LL) comprised between $L_{out}$ and $D_{out}$ about the vertical axis (Z) and/or the bending stiffness ($S_{cross}$) can be the minimum bending stiffness ($S_{cross,\ min}$) of part of the cross beam distant from the longitudinal axis (LL) by a distance comprised between $L_{out}$ and $D_{in}$ about the vertical axis (Z).

Preferably, the maximum distance $L_{out}$ between the first contact area and the longitudinal axis (LL) is higher than the maximum distance $D_{out}$ between the second contact area and the longitudinal axis (LL).

Preferably, the minimum distance $D_{in}$ between the second contact area and the longitudinal axis (LL) is higher than the minimum distance $L_{in}$ between the first contact area and the longitudinal axis (LL).

The intermediate component is preferably obtained by rolling, extruding, forging or casting. Preferably, a machining step is performed following the step of rolling, extruding, forging or casting.

Preferably, the intermediate component comprises at least one flange, connected to at least one outer wall of the absorber. It permits to improve the shearing resistance of the assembly between the cross beam, the intermediate component and the absorber.

Preferably, the intermediate component comprises additional means to attach additional functions, such as structural mounting surfaces, lashing points, towing points or spot light mountings.

In one embodiment, the intermediate component is outfitted with a through opening for the passage of a towing device or a towing eye. Preferably the intermediate component comprises a thread for the towing hook. Preferably, the intermediate component with the thread for the towing hook is obtained by extrusion.

The invention also consists in using the bumper system according to the invention in a motor vehicle. The bumper system according to the invention can used in a electric engine vehicle or a combustion engine vehicle.

BRIEF DESCRIPTION OF THE DRAWINGS

Further aspects, aims, advantages and features of the invention will emerge more clearly on reading the following detailed description of preferred embodiments thereof, given by way of non-limiting example, with reference to the appended figures, wherein:

FIG. 11 is a perspective view of the principle of RCAR bumper barrier test.

FIG. 12 is a perspective view of the principle of pole barrier testpole barrier test.

FIG. 13 is a section view of the connection between the cross beam and the absorber according to the prior art, without using an intermediate component.

FIG. 14 is a section view of the connection between the cross beam and the absorber via an intermediate component according to the invention.

FIG. 15 is a section of the bumper system according to the invention tested according to the RCAR bumper barrier test and the pole barrier test.

DETAILED DESCRIPTION OF THE INVENTION

Figure 1:
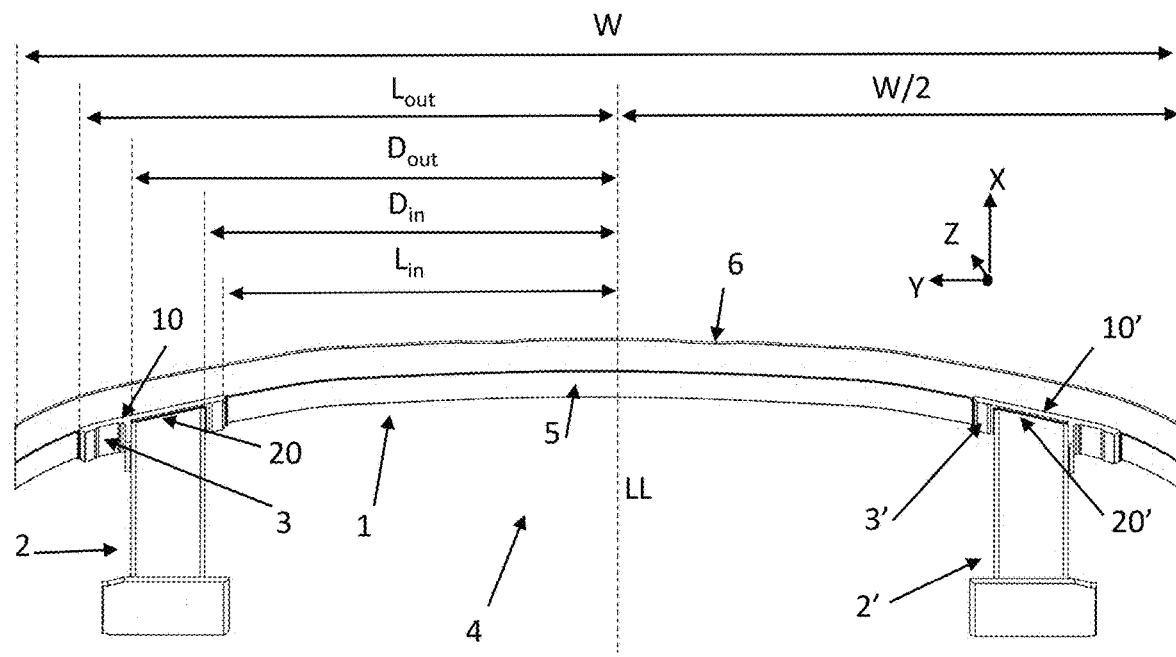
FIG. 1 represents a perspective view of a bumper system comprising a cross beam, absorbers and intermediate components according to the invention.

The invention will be better understood in reference to the figures. Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted. Moreover, the various embodiments and alternative embodiments are not mutually exclusive and may be combined with one another.

FIG. 1 represents a perspective view of a bumper system (4) comprising a cross beam (1), two absorbers (2, 2') and two intermediate components (3, 3'). The cross beam is curved and extending in a transverse direction (Y). It is constituted of an extrusion member with a length W and having a rear wall (5) and a front wall (6). The rear wall (5) is located in the inwardly edge of the curved cross beam. The front wall (6) is located in the outwardly edge of the curved cross beam. The rear wall is opposed and spaced from the front wall. The two absorbers (2, 2') are positioned on the inwardly edge of the curved cross beam and are substantially positioned symmetrically to the longitudinal axis (LL). The longitudinal axis (LL) is passing at mid width W/2 of the cross beam. It may correspond with the symmetrical axis of a motor vehicle (not represented) on which the bumper system can be installed. This longitudinal axis is parallel with a longitudinal direction (X), said longitudinal direction (X) can also correspond to the driving direction of the vehicle (not represented).

In between the cross beam (1) and an absorber (2, 2') an intermediate component (3, 3') is positioned. The intermediate component (3, 3') is connected to the rear wall (5) of the cross beam (1) through a first contact area (10, 10'). In the case represented at FIG. 1, the first contact area corresponds to the whole surface of the intermediate component lying on the rear wall (5). However, in other embodiments where the curving of the cross beam is particularly pronounced in the zone where the intermediate component is positioned, the first contact area can correspond to only a part of the surface of the intermediate component lying on the rear wall and maybe formed by several non-contiguous surfaces.

The intermediate component (3, 3') is also connected to the absorber (2, 2') through a second contact area (20, 20').

Figure 2:
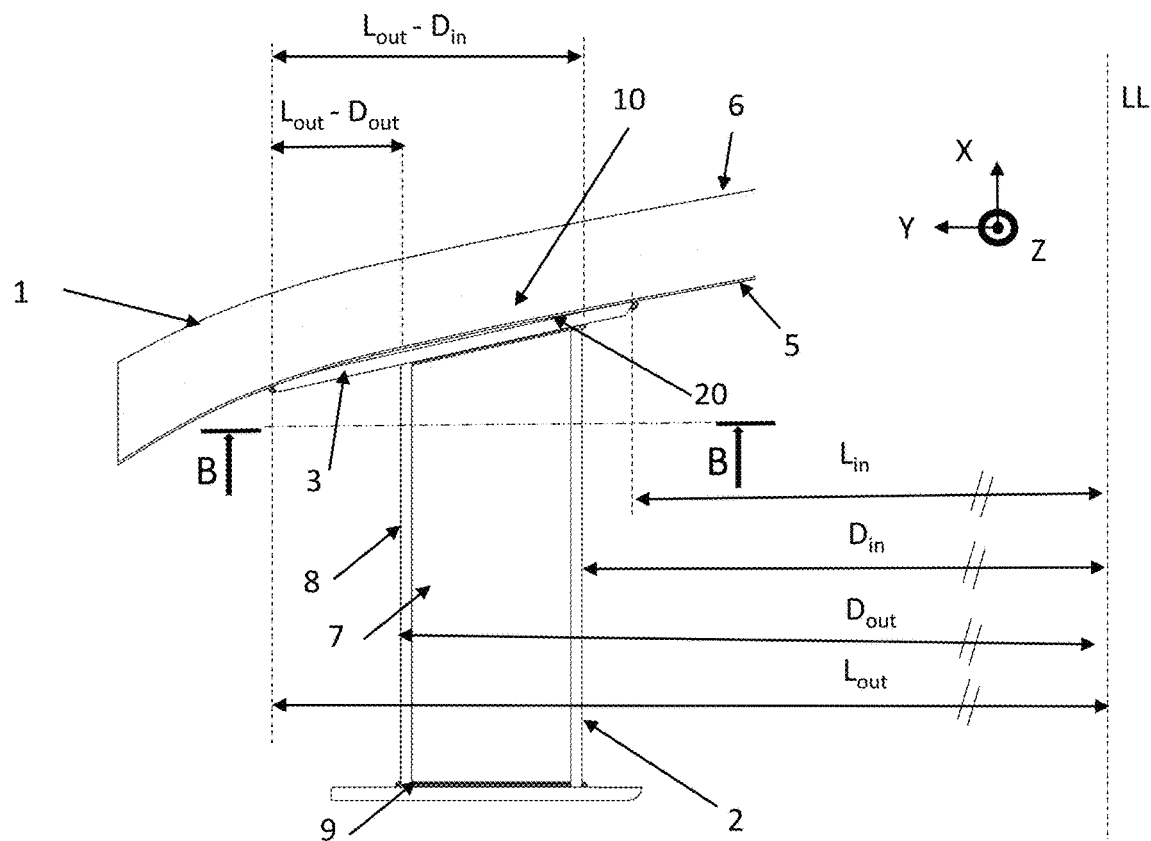
FIG. 2 represents a schematic section of the connection between the cross beam, one absorber and an intermediate component in the plan (X, Y)

FIG. 2 is a cross-section of the left assembly cross beam/intermediate component/absorber represented at FIG. 1. The first contact area is distant from the longitudinal axis (LL), by an internal component distance, called $L_{in}$, and an external component distance, called $L_{out}$, which corresponds respectively to the minimum and maximum distance between said first contact area and the longitudinal axis (LL).

The absorber (2) comprises a profile member (7) which extend parallel to the longitudinal direction (X). The profile member is attached at one end to an endplate (9) which permits to attach the absorber to longitudinal beam of the vehicle (not represented) and at the other end to the intermediate component, through a second contact area (20). The second contact area in the case represented at FIG. 2 corresponds to the whole section of the profile member (7). The second contact area is distant from the longitudinal axis (LL) by an internal profile distance, called $D_{in}$, and an external profile distance, called $D_{out}$, which corresponds respectively to the minimum and maximum distance between the second contact area and the longitudinal axis (LL).

Figure 3:
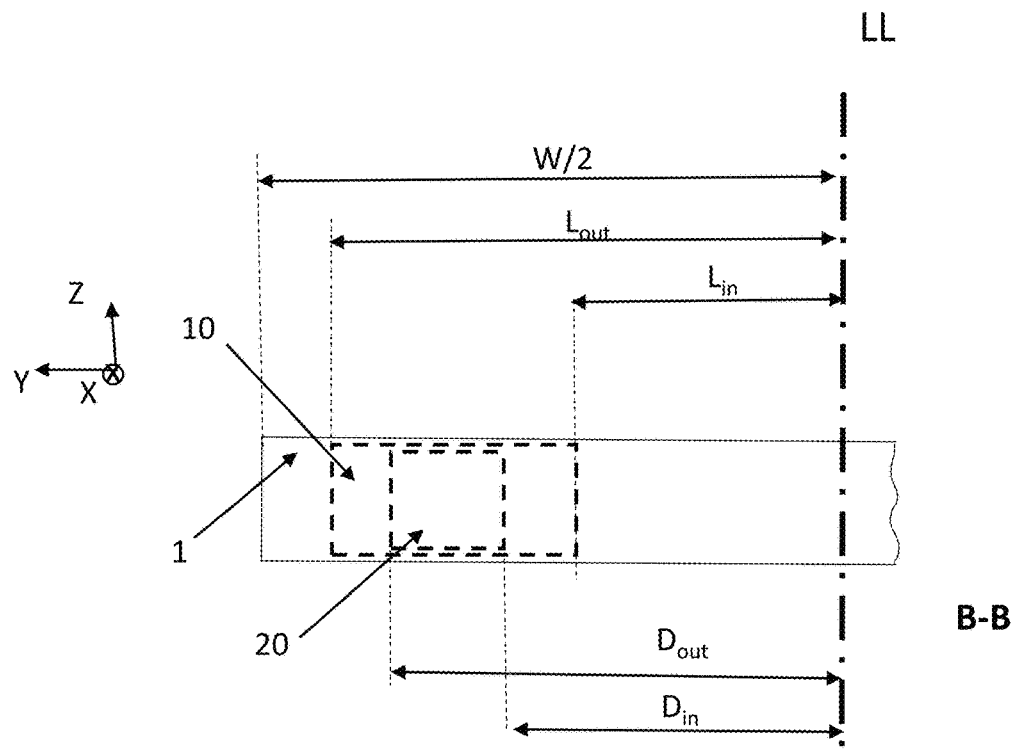
FIG. 3 represents a schematic section of the connection between the cross beam, one absorber and an intermediate component in the plan (Y, Z), showing the first and second contact area.

FIG. 3 is a cross section B-B of FIG. 2 showing the first contact area (10) and the second contact area (20).

Figure 4:
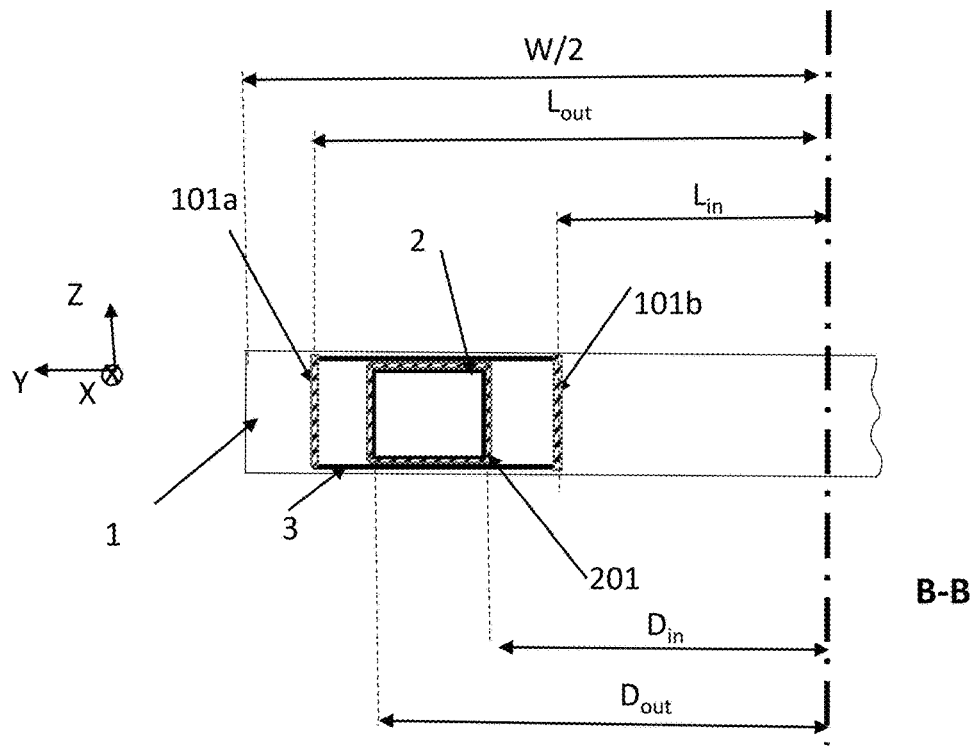
FIG. 4 represents a schematic section of the connection between the cross beam, one absorber and an intermediate component in the plan (Y, Z), showing the location of the attachments.

FIG. 4 corresponds to a similar embodiment of FIG. 3 but shows the location of the connections, where in the represented case corresponds to seam weld lines. In another embodiment (not represented), the connections could be performed by bonding or a mix of bonding and welding. In the represented case, the intermediate component is attached to the cross beam via seam weld line (101a, 101b) which is non continuous, i.e. the seam weld line is composed of two separate seam weld lines (101a, 101b) located on the two extremities of the first contact area; seam weld line 101a is positioned in an area distant of $L_{out}$ from the longitudinal axis LL and line 101b is distant from $L_{in}$ from the longitudinal axis LL. In another embodiment, the two separate seam weld lines can be located in an area distant from the longitudinal axis by a distance comprised between 0.8 $L_{out}$ and $L_{out}$ or between $L_{in}$ and 1.2 $L_{in}$. The intermediate component is attached to the absorber via a seam weld line (201); it is peripheral and partly or fully encircled the second contact area (20).

Figure 5A:
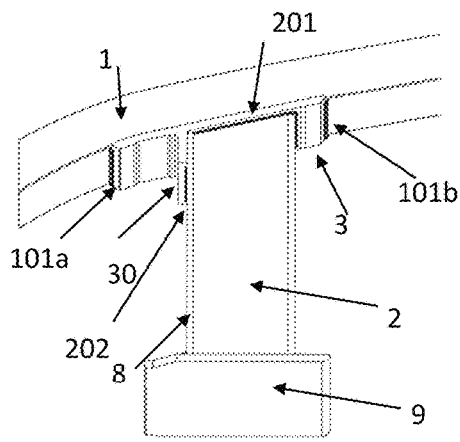
FIG. 5a is a perspective view of connection between the cross beam, one absorber and an intermediate component where the intermediate component has a flange, attached to the outer wall the profile member.
Figure 5B:
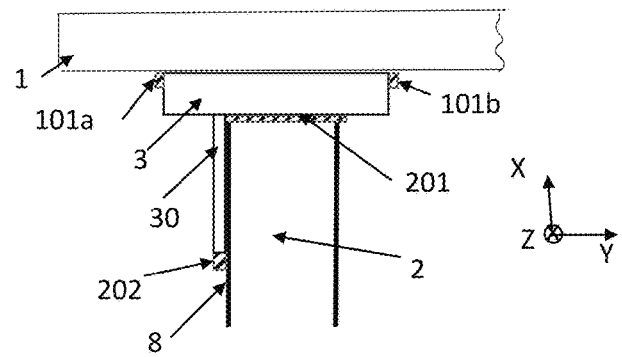
FIG. 5b is a schematic section of the connection represented at FIG. 5a in the plan (X, Y).

FIG. 5a and FIG. 5b represents a particular embodiment of the invention where the intermediate component has a flange (30), connected to the outer wall (8) of the absorber (2). The intermediate component is attached to the absorber via a seam weld line (201, 202) which is non continuous. The seam weld line is composed of two separate seam weld line (201 and 202) wherein one of these seam weld lines (202) correspond to the connection between the flange and the outer wall (8).

Figure 6:
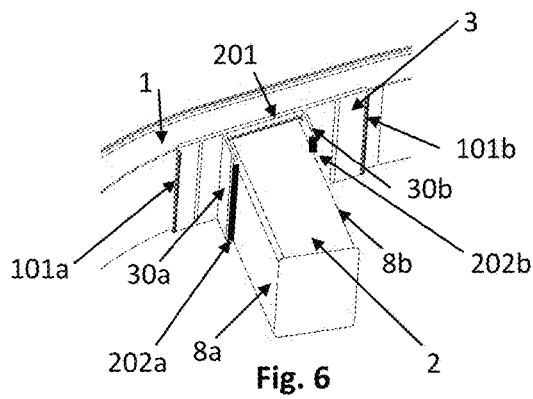
FIG. 6 is a perspective view of the connection between the cross beam and an intermediate component when the intermediate component has two flanges, attached to the outer walls of the profile member.

FIG. 6 differs from FIG. 5 by the presence of two flanges (30a, 30b) in the intermediate component (3). In that case, each flange (30a, 30b) is connected to an outer wall of the absorber (8a, 8b). Each flange is attached via a seam weld line (202a, 202b).

Figure 7:
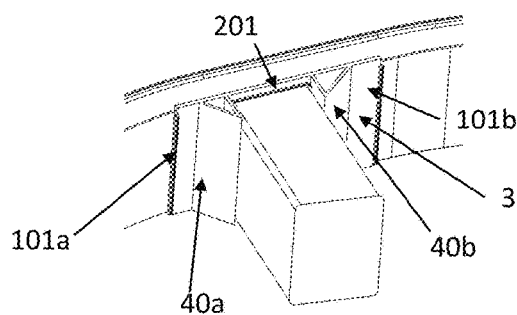
FIG. 7 is a perspective view of the connection between the cross beam and an intermediate component when the intermediate component has reinforcement parts.

FIG. 7 represents a particular embodiment of the invention where the intermediate component comprises reinforcing parts (40a, 40b).

Figure 8:
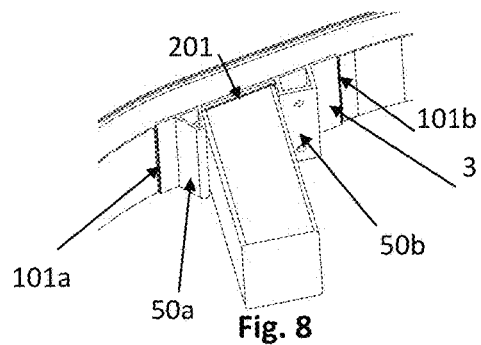
FIG. 8 is a perspective view of the connection between the cross beam and an intermediate component when the intermediate component has additional means for adding functionalities.

FIG. 8 represents a particular embodiment of the invention where the intermediate component comprises attachment means (50a, 50b). The attachment means may permit to attach further components, like horns, electronic devices, reinforcement parts, lashing points or spot light.

Figure 9:
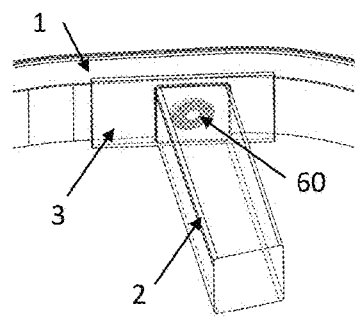
FIG. 9 is a perspective view of the connection between the bumper cross beam and an intermediate component where the intermediate component fulfils also the function of a towing eye.
Figure 10:
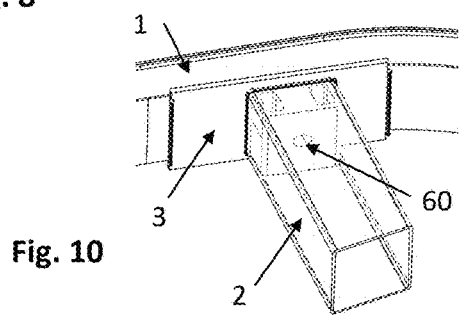
FIG. 10 is a variant of FIG. 9.

FIG. 9 and FIG. 10 represent the case where the intermediate component (3) is outfitted with a through opening for the passage of a towing device. FIG. 9 corresponds to the case where the thread for the towing hook (60) is attached separately to the intermediate component. The thread is in this case is included into an extra part which is attached to the intermediate component, for instance by welding or bonding. FIG. 10 corresponds to the case where the thread is integrated into the intermediate component. The intermediate component and the thread is monolithic, i.e. without the need of any external attachments. Preferably, it is obtained by extrusion.

EXAMPLE

Figure 16:
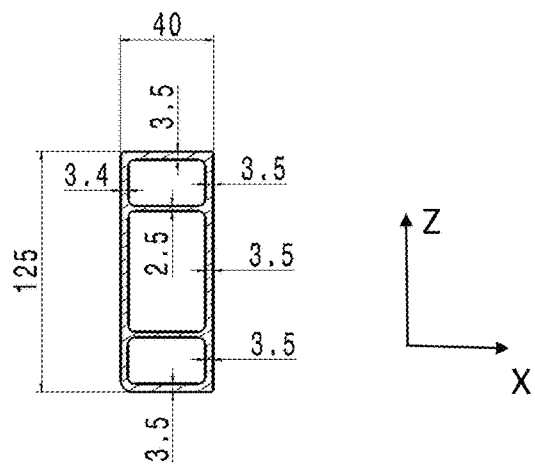
FIG. 16 is a section of the cross beam tested according to the RCAR bumper barrier test and the pole barrier test.
Figure 17:
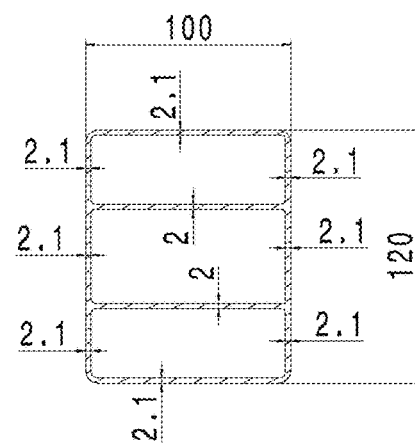
FIG. 17 is a section of the absorber tested according to the RCAR bumper barrier test and the pole barrier test.

A RCAR bumper barrier test and a pole barrier test on a bumper system have been executed on two types of bumper system: a first bumper system, represented at FIG. 13 corresponding to prior art, i.e. without an intermediate component and a second bumper system represented at FIG. 14 corresponding to the invention. For both configurations, the same geometry of cross beam with three chambers, represented on FIG. 16, has been used with a total length of 1300 mm. The same absorbers, represented on FIG. 17, has been used and are positioned symmetrically around the longitudinal axis LL at a distance of 430 mm (see FIG. 15). The bumper system for both configurations is made in aluminium alloy, having a young modulus of 70 GPa.

According to the prior art, the absorbers are welded directly to the cross beam. According to the invention, an intermediate component with a flange, made in aluminium alloy with a young modulus of 70 GPa and represented on FIG. 14 is placed between the cross beam and the absorber and is attached by welding to the cross beam through a first contact area and to the absorber through a second contact area. Table 1 shows the distance between the longitudinal axis LL and the first and second contact areas (also represented on FIG. 15). The corresponding area moment of inertia about the vertical Z axis of the part of the cross beam distant from the longitudinal axis (LL) by a distance comprised between $L_{out}$ and $D_{in}$ and the area moment of inertia about the vertical Z axis of the intermediate component distant between $L_{out}$ and $D_{out}$ are also included in Table 1. They have been calculated using the software CATIA V5.

The corresponding bending stiffness is then deduced by multiplying the area moment of inertia by the young modulus of the material constituting the two elements (here aluminum).

It can be observed that the bending stiffness of the intermediate component ($S_{interm}$=84 Nm$^2$) is much smaller than the bending stiffness of the cross beam ($S_{cross}$=19460 Nm$^2$), by a factor of 0.43%.

TABLEAU 1

| | | cross beam | | | | Intermediate component | |
|---|---|---|---|---|---|---|---|
| First contact area | Second contact area | Area moment of inertia | | Bending stiffness | Area moment of inertia | Bending stiffness | |
| $L_{in}$ (mm) | $L_{out}$ (mm) | $D_{in}$ (mm) | $D_{out}$ (mm) | $I_{cross}$ (cm4) | $S_{cross}$ (Nm$^2$) | $I_{interm}$ (cm4) | $S_{interm}$ (Nm$^2$) |
| 410 | 585 | 430 | 530 | 27.80 | 19460 | 0.12 | 84 |

To perform the test, the bumper system (4) is fixed on the body-in-white longitudinals (13a, 13b), and said longitudinals are fixed on a bob-sled (16) as represented at FIG. 11 and FIG. 12. The RCAR bumper barrier test is conducted at 10.5 km/h and the pole barrier test at a speed ranging between 15 and 64 km/h.

The energy absorption capacity of the bumper system during a crash is evaluated by the load displacement response. The area under the load-displacement curve is a measure of the energy absorbed. During a low speed impact, the bumper system has the function of preventing damage to the body in white. Hence, the maximum impact load transmitted through the system has to be limited. The maximal displacement is specified by the vehicle design. Indeed, it is needed that no damage of the cooling system, nor of security-relevant components occur during the crash.

The ideal bumper system has a load-displacement response which acts as a step function; the load rapidly reaches the maximum value and remains there throughout the crash. For a given maximum displacement, higher load, better bumper system.

Figure 18:
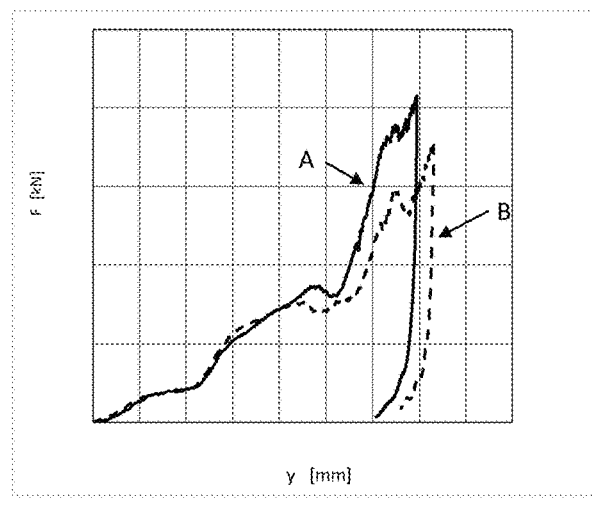
FIG. 18 represents the load that can sustain the bumper system in case of a frontal crash against a barrier, according to the RCAR bumper barrier test, when the cross beam is attached directly to the absorber or if an intermediate component according to the invention is used.
Figure 19:
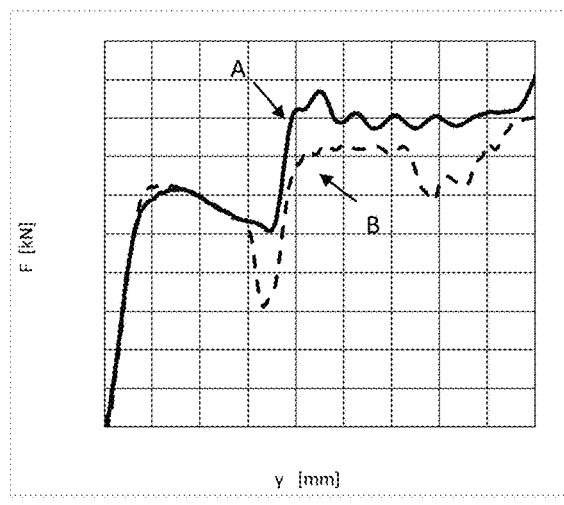
FIG. 19 represents the load that can sustain the bumper system in case of a frontal crash against a pole when the cross beam is attached directly to the absorber or if an intermediate component according to the invention is used.

The load-force versus the displacement for the two configurations with and without the intermediate components and for the two conditions of tests (RCAR bumper barrier and Pole barrier tests) are represented on FIGS. 18 and 19. The dashed lines correspond to the bumper system according to prior art (curve B), without an intermediate component and the bold lines to the bumper system according to the invention (curve A). In both cases, the curves correspond to simulated curves by FEM modelling.

It can be observed that in the case of the RCAR bumper barrier test (FIG. 18), the bumper system with an intermediate component according to the invention (curve A), sustains for the smaller displacements a similar load compared to the prior art (curve B); but at higher displacements the force level is higher. This better behavior is attributed to the fact that the cross beam is still attached to the absorber via the intermediate component whereas in the case of the prior art, there is a damage initiated at the interface between the cross beam and the absorber. It can be mentioned that the presence of the intermediate component permits also to reduce the barrier intrusion, which is beneficial for the integrity of car components, such as cooling systems.

During a certain range of displacement, the force sustained by the bumper system according to the invention is smaller than the corresponding force of the prior art due to the lower stiffness of the assembly, but it has no effect of the total energy absorption of the bumper system, which remain higher than the bumper system according to the prior art.

A similar plot (FIG. 19) has been obtained during the pole barrier test. It is observed that the bumper system according to the invention (curve A) permits to sustain a higher load than a bumper system according to the prior art (Curve B).

The invention claimed is:

1. A bumper system (4) for a motor vehicle comprising
    A cross beam (1) which is globally orientated in a transverse direction (Y), said cross beam comprising a front wall (6) adapted to receive a crash impact force and a rear wall (5) opposed and spaced from said front wall,
    At least one absorber (2)
    At least an intermediate component (3) to attach the absorber (2) to the cross beam (1),
    Said intermediate component (3) being connected to the rear wall (5) through a first contact area (10), distant from a longitudinal axis (LL), by an internal component distance, called $L_{in}$, and an external component distance, called $L_{out}$, which corresponds respectively to the minimum and maximum distance between said first contact area (10) and the longitudinal axis (LL), said longitudinal axis (LL) passing at mid width of the cross beam and being perpendicular to the transverse direction (Y), Said intermediate component (3) being connected to the absorber (2) through a second contact area (20) distant from the longitudinal axis (LL) by an internal profile distance, called $D_{in}$, and an external profile distance, called $D_{out}$ which corresponds respectively to the minimum and maximum distance between the second contact (20) area and the longitudinal axis (LL), wherein a part of the intermediate component distant from the longitudinal axis (LL) by a distance comprised between $L_{out}$ and $D_{out}$ has a smaller bending stiffness ($S_{interm}$) about a vertical axis (Z) than a part of the cross beam distant from the longitudinal axis (LL) by a distance comprised between $L_{out}$ and $D_{in}$ ($S_{cross}$), said vertical axis (Z) being perpendicular to the transverse direction (Y) and the longitudinal axis (LL), bending stiffness about a vertical axis (Z) being defined like the product of the modulus of elasticity of the beam by his area moment of inertia compared to the vertical axis (Z).

2. A bumper system (4) according to claim 1 wherein the said bending stiffness of a part of the intermediate component comprised between $L_{out}$ and $D_{out}$ ($S_{interm}$) about the vertical direction (Z) is not constant between $L_{out}$ and $D_{out}$ and has a minimum bending stiffness ($S_{interm, min}$) about the vertical axis (Z) and/or wherein the said bending stiffness of a part the cross beam comprised between $L_{out}$ and $D_{in}$ is not constant between $L_{out}$ and $D_{in}$, and has a minimum bending stiffness ($S_{cross, min}$) about the vertical axis (Z)

and wherein the said minimum bending stiffness ($S_{interm, min}$) of part the intermediate component is smaller than the said minimum bending stiffness of part the cross beam ($S_{cross, min}$).

3. A bumper system (4) according to claim 1 wherein a part of the intermediate component distant from the longitudinal axis (LL) by a distance comprised between $L_{out}$ and $D_{out}$ has a minimum bending stiffness ($S_{interm, min}$) about the vertical axis (Z) lower than 100%, more preferably lower than 50%, even more preferably lower than 10% or 1% than the minimum bending stiffness of a part of the cross beam distant from the longitudinal axis (LL) by a distance comprised between $L_{out}$ and $D_{in}$ ($S_{cross, min}$).

4. A bumper system (4) according to claim 3 wherein the ratio $S_{interm, min}/S_{cross, min}$ is preferably lower than 1, more preferably lower than 0.5, even more preferably lower than 0.1 or 0.01.

5. A bumper system (4) for a motor vehicle according to claim 1 wherein at least a part of the first and/or the second contact area is welded and/or bonded (101*a*, 101*b*, 201*a*, 201*b*).

6. A bumper system (4) for a motor vehicle according to claim 5 wherein the part of the first contact area and/or of the second contact area which being welded or bonded is non continuous.

7. A bumper system (4) for a motor vehicle according to claim 5 wherein the part of the first contact area, which is welded or bonded (101*a*, 101*b*), is distant from the longitudinal axis (LL) by a distance comprised between 0.8 $L_{out}$ and $L_{out}$ or between $L_{in}$ and 1.2 $L_{in}$.

8. A bumper system (4) for a motor vehicle according to claim 1 wherein the intermediate component (3) is obtained by rolling, extruding, forging or casting.

9. A bumper system (4) for a motor vehicle according to claim 1 wherein the absorber has at least one outer wall (8, 8*a*, 8*b*) and wherein the intermediate component comprises a flange (30, 30*a*, 30*b*), connected to at least one outer wall (8, 8*a*, 8*b*) of the absorber.

10. A bumper system (4) for a motor vehicle according to claim 1 wherein the intermediate component (3) comprises reinforcements (40*a*, 40*b*).

11. A bumper system (4) for a motor vehicle according to claim 1, wherein the intermediate component (3) comprises additional means (50*a*, 50*b*) to attach additional functions.

12. A bumper system for a motor vehicle according to claim 1 wherein the intermediate component is outfitted with a through opening for the passage of a towing device or a towing eye (60).

13. Use of a bumper system according to claim 1 in a motor vehicle.

* * * * *